United States Patent Office 3,007,812
Patented Nov. 7, 1961

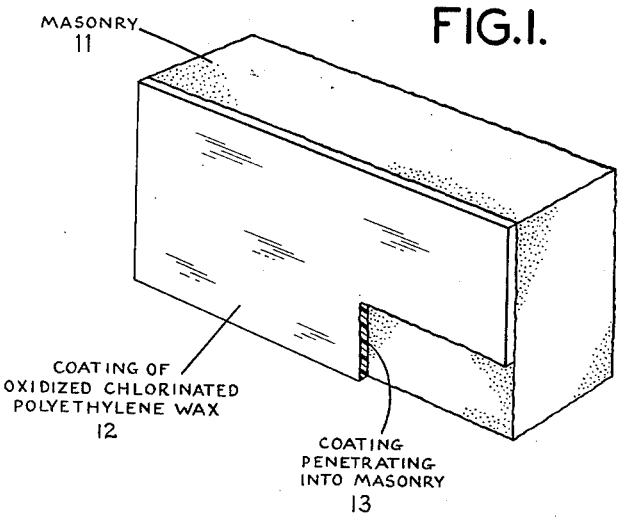
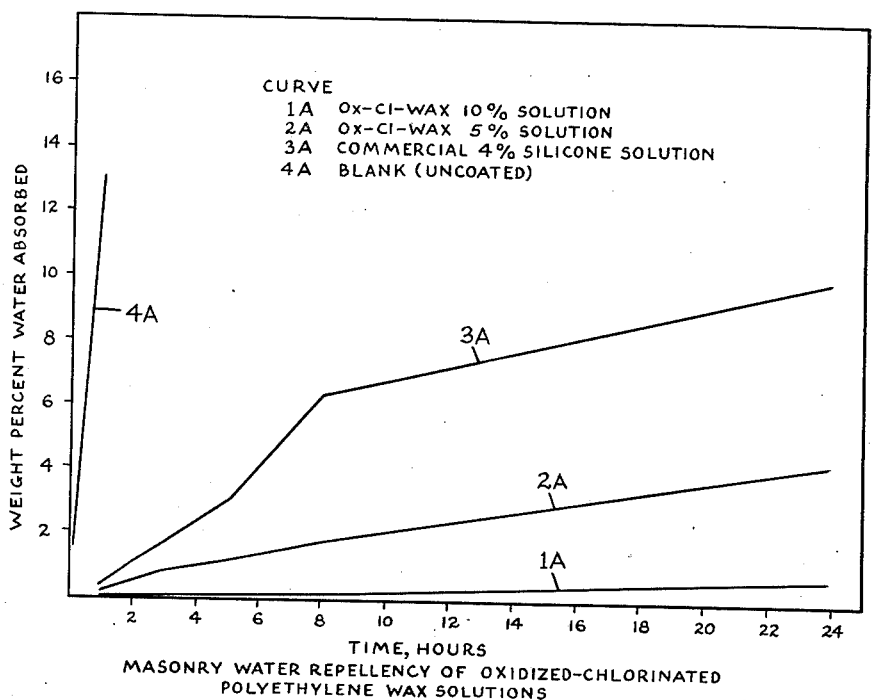

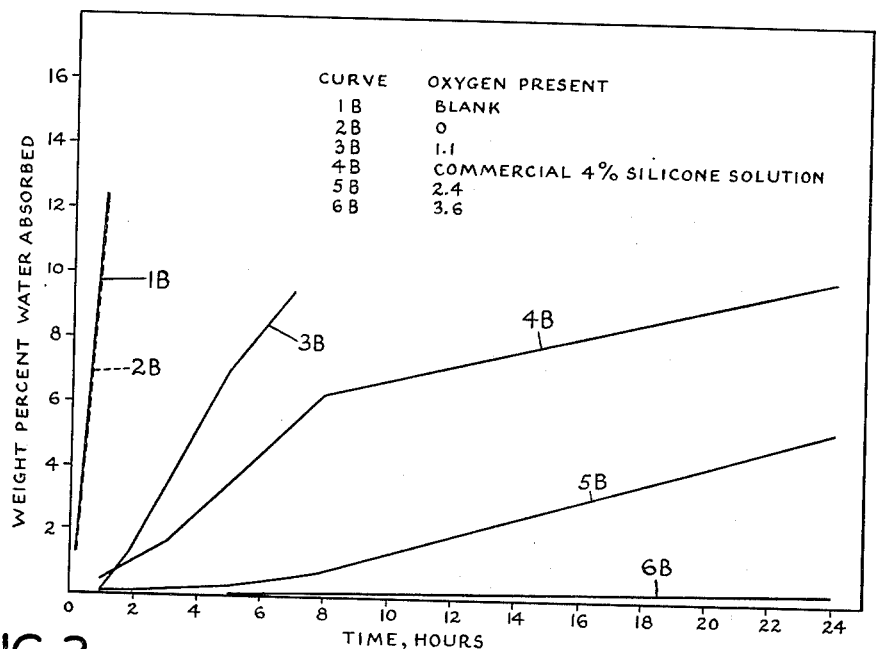
FIG.3. EFFECT OF DEGREE OF OXIDATION ON MASONRY WATER REPELLENCY OF 60% CHLORINATED POLYETHYLENE WAX
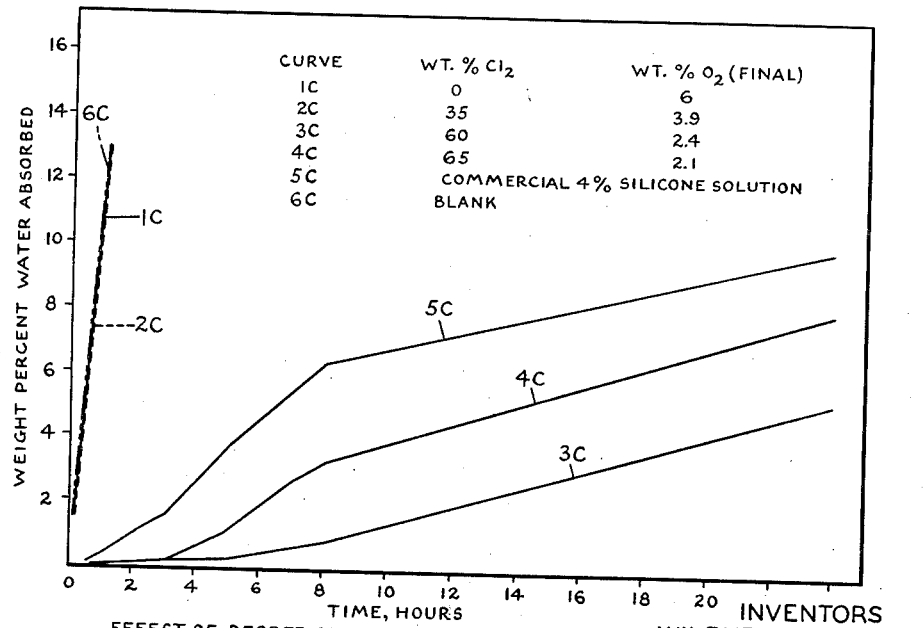
FIG.4. EFFECT OF DEGREE OF CHLORINATION ON OXIDIZED POLYETHYLENE WAX OF 6% INITIAL OXYGEN
INVENTORS
WILBUR F. CHAPMAN
BURTON F. SMITH
BY Elizabeth Hunter
ATTORNEY

3,007,812
WATER-REPELLENT COMPOSITIONS, METHOD OF WATER-PROOFING POROUS SURFACES THEREWITH, AND RESULTING WATER-REPELLENT SURFACES
Burton F. B. Smith, Madison, and Wilbur F. Chapman, Morristown, N.J., assignors to Allied Chemical Corporation, a corporation of New York
Filed Feb. 11, 1957, Ser. No. 639,285
13 Claims. (Cl. 117—123)

This invention relates to water-repellent compositions, to a method of waterproofing porous surfaces therewith, and to the resulting water-repellent surfaces.

It is well known that porous surfaces, particularly masonry construction materials such as brick, concrete, cinder blocks and the like, suffer severely from exposure to the elements of weather such as repeated wetting, freezing, thawing, etc. Under such weathering, brick structures tend to effloresce, i.e. to exude soluble salts contained in the bricks to the surface and then deposit the salts as an unsightly white coating. Concrete structures of all kinds, including cement and cinder blocks, pavements and the like, tend to suffer erosion or spalling from water exposure, particularly when combined with alternate freezing and thawing. Such erosion also occurs in the mortar fillings in natural stone and brick structures causing leakage and eventual deterioration of the structure.

Many efforts have been made in the past to alleviate or reduce such damage, but the degree of water repellency and durability of the coatings heretofore used have been entirely inadequate to afford lasting protection to such structures.

Paraffin waxes have been found to impart a slight degree of water repellency, while polyethylene waxes per se, and in their oxidized and chlorinated forms when applied as films from solutions or dispersions, fail completely to impart any substantial degree of water repellency.

In recent years, liquid coating materials have been developed, containing silicone resins, which, when applied to masonry have afforded higher degrees of lasting water-repellency than had been achieved in the past. Such coatings, while providing a great advance over heretofore known treatments, are, however, exceedingly expensive, due to the high cost of the silicone material and, accordingly, their use has been limited.

An object of the present invention, therefore, is to provide water-repellent compositions adapted for the protection of porous surfaces, particularly masonry materials, which are lower in cost and at least substantially equal in water repellency to prior art compositions.

Another object is to provide a method for preventing unsightly efflorescence of brick surfaces.

These and other objects are accomplished according to our invention wherein saturated, polyethylene waxy products, having average molecular weights between about 1,000 and about 6,000, and which are both oxidized and chlorinated to a critical extent, i.e. to contain at least about 1%, preferably between about 2% and about 5% of oxygen by weight based on the weight of the oxidized-chlorinated polyethylene wax material, and to contain between about 55% and about 70% by weight of chlorine on the same basis, dissolved in a volatile solvent, are applied to porous surfaces such as masonry materials.

Oxidized-chlorinated polyethylene waxes used in our compositions may be prepared from oxidized waxes made according to the process described in copending application Serial No. 515,770 of Michael Erchak, Jr., which comprises subjecting normally solid, hard, waxy saturated aliphatic compounds characterized by the presence of a recurring —$CH_2$— group and having average molecular weights between about 1,000 and about 3,000, in the liquid phase to the action of an oxygen-containing gas, to cause absorption for the purposes of the present invention, of at least about 5 pounds of oxygen per 100 pounds of wax, preferably between about 10 pounds and about 15 pounds of oxygen, per 100 pounds wax, i.e. to provide an oxidized wax containing at least about 3% preferably between about 6% and about 9% of oxygen by weight based on the weight of the oxidized wax, and acid numbers of not more than about 50, preferably between about 30 and about 45. The oxidized polyethylene/isopropanol telomer waxes prepared according to the above method are especially preferred.

After the oxidized wax is prepared, it may be chlorinated by preparing a dispersion in a chlorine-stable medium such as carbon tetrachloride, tetrachloroethane, trichlorofluoromethane, etc., containing up to about 25 parts by weight of wax per 100 parts by volume of medium, preferably between about 5 and about 25 parts of wax, maintaining the dispersion at temperatures between about 30° C. and about 80° C. while introducing molecular chlorine into the dispersion until the resulting waxy material contains between about 55% and about 70% by weight of chlorine. Such waxes then may contain between about 1% and about 5% of oxygen based on the weight of the oxidized-chlorinated wax product.

A specific example of the preparation is as follows:

Two parts of oxidized polyethylene/isopropanol telomer wax having an everage molecular weight of about 800 and an oxygen content of about 9% were charged with 3190 parts of $CCl_4$ to a reaction flask equipped with stirrer, and heated with a water bath to dissolve the polyethylene wax. Chlorine was then introduced into the solution at the rate of approximately 1.5 liters per minute, for 2.5 hours, while maintaining reaction temperature at about 70° C. The solution was then aspirated to remove residual chlorine and HCl. The product was then isolated by precipitation from methanol. Chlorine content was determined as 60.1%; oxygen content was 3%.

As brought out above, the average molecular weights of the oxidized-chlorinated waxes used in our invention may range between about 1,000 and about 6,000. Starting with polyethylene waxes having average molecular weights from about 1,000 to about 3,000, oxidation of such polyethylene waxes will often result in oxidized waxes of average molecular weights less than those of the original waxes. Chlorination of the oxidized waxes to the extent necessary for use in our invention, may then produce oxidized-chlorinated waxes of the same or of considerably higher average molecular weights than the starting waxes, for example up to about 6,000 or higher.

We have found that the oxygen and chlorine contents of the resulting oxidized chlorinated waxy material are critical in providing high water repellency. Neither oxidation nor chlorination alone appears to confer any significant water repellency.

In the range of optimum chlorine content, at least about 1% oxygen is required to confer water repellency, and further increasing the oxygen content of the wax increases the water repellency of the resulting material. In the range of optimum oxygen content, increasing chlorine content confers no appreciable water repellency until about 55% chlorine has been introduced and then water repellency increases to a maximum in the range of 60–65% chlorine, decreasing slightly upon introduction of additional chlorine up to the 70% maximum.

Thus, we use a polyethylene wax as described containing at least about 55% chlorine and at least about 1% oxygen to gain the advantages of water repellency described. We prefer to use a polyethylene wax containing between about 2% and about 5% oxygen and between about 55% and about 70% chlorine. Higher degrees of oxidation than the 5% mentioned may be used but do not appear to be necessary. 70% chlorination is about the maximum that can be introduced into the waxes contemplated for use in the invention.

As brought out above, suitable oxygen contents are those obtained by the absorption, during the oxidation process, of at least about 5 parts by weight of oxygen per 100 parts of wax. Such waxes show on analysis somewhat less oxygen, for example waxes which absorb 5, 10 and 15 parts of oxygen per 100 parts of wax, will usually contain about 3%, 6% and 9% by weight respectively, as determined by the standard oxygen determination method which consists in determining carbon and hydrogen and reporting oxygen as the difference.

Percent chlorine is readily determined according to the standard fusion method as described by Mederl and Mederl in "Organic Quantitative Micro Analysis," 2nd edition, p. 165, and when referred to herein, means the weight of chlorine as determined by such method, per 100 weights of product analyzed.

The oxidized-chlorinated polyethylenic waxes used in the compositions of the invention are characterized by a high degree of solubility in aromatic hydrocarbons, ketones and cycloaliphatic unsaturated hydrocarbons at normal room temperatures so as to be substantially completely soluble therein while exhibiting little or no solubility in saturated or unsaturated straight chain aliphatic hydrocarbons.

Thus, compositions adapted to be applied as protective coatings to masonry surfaces according to the invention may be prepared by simply dissolving the wax in the solvent, for example, xylene, benzene, toluene, cyclohexene, methyl cyclohexene, acetone, cyclohexanon, methyl ethyl ketone or other liquid aromatic hydrocarbon, or cycloaliphatic unsaturated hydrocarbon or ketone having boiling point between about 50° C. and about 250° C. preferably between about 75° C. and about 175° C. Single applications of solutions containing as little as 5% of the oxidized-chlorinated polyethylenic wax provide adequate water-repellency for many purposes. Greater water repellencies, however, are produced by the application of more concentrated solutions, or by multiple application of the dilute solutions. Mixtures of two or more of the above solvents may, of course, be used.

In general, it is feasible to apply repellent solutions to porous surfaces to afford coverage of between about 70 and about 130 square feet of surface per gallon of solution. At such coverage rates, solutions containing from about 5% to about 10% of the oxidized-chlorinated wax of the invention provide adequate repellency. Higher concentrations may be used but are not usually necessary. Thus, for adequate protection, the coated surface should be covered with at least about 0.1 pound of solid repellent material per 100 square feet after evaporation of the solvent, preferably between about 0.3 pound and about 1.0 pound.

The water repellent solutions of our invention may be applied to the surface to be protected by any suitable means including brushing, spraying, dipping, flooding, etc.

The effectiveness of our compositions as protective coatings for masonry materials may be evaluated by two standard tests, (1) water repellency of the coated object, i.e. weight of water absorbed through the protective coating over a period of time when immersed in water, and (2) transpiration rate, i.e. the rate at which absorbed moisture is released through the coating, thus allowing the masonry to "breathe". In the case of bricks, presence or absence of efflorescence is also observed.

Water repellency characteristics, as illustrated and referred to herein, were measured according to the test procedure described in ASTM bulletin for January 1949, pages 70-71, by first drying common clay brick or cement blocks in a circulating oven at 80°-90° C., until weight loss per brick or block was less than 10 grams in 24 hours, then coating the face and lower half of the brick with repellent solution at a coverage of about one gallon per 130 to 70 square feet of surface, 8-9 grams of solution per common brick in one dip or 11-15 grams per brick if double dipped.

The bricks were then placed coated face up and air dried 24 hours at room temperature (ca. 25° C.). The bricks were then tested for water absorption by placing them coated face down in ¼ inch of water (the level of water being below the uncoated portion of the brick) and this level was maintained as water was removed by absorption into the bricks. At various intervals, the bricks were removed from the water, the surface patted "dry" with a cotton towel, and weighed. The percentage increase in weight due to water absorption was calculated from the weights taken at these intervals. When the bricks had absorbed maximum water content or reached a plateau of absorption, they were removed from water, the uncoated half was wrapped in aluminum foil and tape, then placed coated face up in the atmosphere to determine transpiration rate.

Transpiration rate was determined by weighing the thus protected coated bricks initially and at 24 hour or 48 hour intervals for several days, and recording the loss of weight due to transpiration and calculating the weight percent of initial absorbed water lost vs. time, to give the rate of transpiration in percent loss per hour.

Effect of repeated moisture absorption and drying was determined by drying the coated bricks in a 90° C. oven overnight (16 hours) driving out all moisture, and again testing for absorption as above.

Effect of the coatings on efflorescence was determined by half-coating bricks as described under test #1, and placing them, uncoated surface down, in a concentrated solution of sodium sulfate, immersed to ½ inch depth and observing efflorescence at the coated surface at intervals.

In the drawings a typical coated masonry surface is shown in FIGURE 1 in which the numeral 11 represents the masonry surface, 12 represents the water repellent coating thereon, 13 the depth of penetration into the porous masonry. Some of the data of the specific examples which follow are presented graphically in the succeeding figures of which FIGURE 2 illustrates the water repellency of one of our preferred oxidized-chlorinated polyethylene wax materials when applied as coatings to clay bricks as described in Examples 1, 2, and 12.

FIGURE 3 illustrates the effect of degree of oxidation on the water repellency of chlorinated polyethylene wax containing the optimum chlorine content of about 60% as brought out in Examples 3, 4, 7, 9 and 12.

FIGURE 4 illustrates the effect of degree of chlorination on 6% oxidized polyethylene wax, as shown in Examples 5, 6, 7, 8 and 12.

In FIGURE 2, curve 1A plots the data of Example 2 and shows the weight percent of water absorbed through the coated face of a clay brick coated with a 10% solution in xylene of a 3.6% oxygen-containing, 60% chlorine-containing polyethylene wax over a 24 hour period. Curve 2A (Ex. 1) shows comparable data for a 5% solution of the same oxidized-chlorinated polyethylene wax, while curve 3A charts for comparison the absorption through a commercial silicone solution coating (Ex. 12). Curve 4A illustrates absorption by an uncoated brick.

In FIGURE 3, curve 1B shows the water absorption of an uncoated brick. Curve 2B, which is superimposed on curve 1B, shows the water absorption of a 60% chlorinated (unoxidized) polyethylene wax-coated brick to be substantially as great as that of the uncoated brick, (Ex. 9). Curve 3B illustrates the water repellency conferred by a 1% oxidized 60% chlorinated polyethylene wax applied to brick as a 10% solution in xylene as described in Example 4. Curves 5B and 6B represent comparable data obtained using 2.4% and 3.6% oxidized-60% chlorinated wax solutions (Examples 7 and 3); while curve 4B illustrates the repellency of a commercial silicone-solution coated brick (Ex. 12).

In FIGURE 4, curves 1C, 2C and 6C, which all follow the same line, illustrate the repellency of uncoated brick (Ex. 15), a 9–12% oxygen-containing but unchlorinated polyethylene wax (Ex. 8) and a 35% chlorinated 3.9% oxidized polyethylene wax (Ex. 5). Curves 3C and 4C of this figure illustrate the water repellency conferred by 60% and 65% chlorinated-oxidized polyethylene waxes containing respectively 2.4% and 2.1% oxygen (Examples 7 and 6). Curve 5C illustrates the water repellency of a commercial silicone solution ("Daracone"), sold as a masonry water-repellent, included for comparison (Ex. 12).

The following specific examples further illustrate our invention.

EXAMPLES 1–15

Five and ten percent solutions in xylene were prepared of oxidized-chlorinated polyethylene/isopropanol telomer waxes (prepared from polyethylene/isopropanol waxes originally having average molecular weights of about 2,000), containing varying percentages of oxygen and chlorine. These solutions were applied to the sides and one face of standard 4" x 8" x 2" common clay bricks by immersing the lower half of a brick into each solution to cause absorption of about 12 grams of solution per brick, equivalent to a coverage of approximately 100 square feet of surface per gallon of solution. The bricks were then placed coated side up and air dried at room temperature (ca. 25° C.) for 24 hours, weighed, then placed coated face down in ¼ inch of distilled water, additional water being added as the water level receded due to absorption into the bricks. At various intervals thereafter, the bricks were removed from the water, surface dried by patting with a cotton towel, weighed, and the percent weight gain calculated and recorded.

Average molecular weights of the oxidized-chlorinated waxes of this type are given below:

Wax of example: Average molecular weight
1 ............................................. 2,200
2 ............................................. 2,000
3 ............................................. 2,000
4 ............................................. 4,500
6 ............................................. 3,300
7 ............................................. 3,000

For comparative purposes, uncoated bricks, and bricks coated with other materials were similarly immersed and weighed.

Results are shown in Table I below.

It will be noted from the table, particularly Examples 1–7, that best water repellency is imparted by coatings of oxidized-chlorinated polyethylene waxes of 2% to 3.5% oxygen content and about 60% to 65% chlorine, applied as a 10% solution. Example 10 illustrates that water repellency is imparted by an oxidized, chlorinated Fischer-Tropsch wax, containing about 58% chlorine and 1.3% oxygen, having an average molecular weight about 1100.

Examples 8 and 9 show that virtually no water repellency is imparted by an oxidized-unchlorinated polyethylene wax (Ex. 8) or by a chlorinated, unoxidized polyethylene wax, (Ex. 9). Comparison of Examples 9, 7 and 3 show the effect of varying degrees of oxidation (i.e. 0, 1.1, 2.4 and 3.6% respectively) on water repellency of a 60% chlorinated polyethylene wax. Comparison of Examples 5, 7 and 6 illustrate the effect of increasing degree of chlorination on the water repellency of an oxidized polyethylene wax containing 6% oxygen before chlorination. Comparison of Examples 1 and 2 show the effect of increasing solution concentration (film weight) on water repellency of a 3% oxidized-66% chlorinated polyethylene wax. Comparison of Examples 15 (blank), 13 (paraffin) and 11 and 12 (commercial silicone repellents) with e.g. Example 2, illustrates the great superiority in water repellency of the oxidized-chlorinated polyethylene wax materials of the invention.

EXAMPLE 16

A series of transpiration tests were made on the coated bricks of Examples 3, 14 and 12 (i.e. 5% and 10% solutions of 3.6% oxidized 60% chlorinated polyethylene and a commercial silicone solution respectively) after each had absorbed the indicated amount of water after completion of the repellency tests described in the previous examples. Water-saturated uncoated bricks were tested for comparison.

In these tests, the uncoated surfaces of the bricks were sealed with metal foil, the bricks were weighed, placed coated side up, and reweighed at intervals and the percent weight loss recorded.

Results are given in Table II below. All figures are averages of 2 to 4 tests.

TABLE II
Transpiration rates through repellent coatings on bricks

| Coating material | Initial water grams | Percent water weight loss (hrs.) | | | | | | | |
|---|---|---|---|---|---|---|---|---|---|
| | | 20 | 50 | 70 | 100 | 120 | 140 | 190 | 240 |
| Blank (none) | 197 | 35 | 63 | 68 | 73 | 75 | 76 | | |
| Commercial 4–5% silicone solution | 240 | 12 | 26 | 32 | 41 | 45 | 48 | 58 | 67 |
| 3.6% oxidized-60% chlorinated polyethylene wax 5% solution | 80 | 15 | 35 | 46 | 56 | 62 | 66 | 73 | 80 |
| 3.6% oxidized-60% chlorinated polyethylene wax 10% solution | 60 | 7 | 17 | 25 | 32 | 43 | 55 | | |

TABLE I
Masonry water repellencies of various oxidized-chlorinated polyethylene wax coatings and certain other coating compositions

| Example No. | Material | Weight percent conc. in xylene | Degree of ox. percent $O_2$ | Degree of chlor. percent $Cl_2$ | Percent weight gain (hrs.) | | | | | | | |
|---|---|---|---|---|---|---|---|---|---|---|---|---|
| | | | | | 1 | 2 | 3 | 5 | 6 | 7 | 8 | 24 |
| 1 | Oxidized-chlorinated polyethylene wax | 5 | 3.0 | 66.4 | 0.04 | 0.8 | 1.3 | 2.5 | | | 4.0 | 7.3 |
| 2 | do | 10 | 3.0 | 66.4 | 0.05 | | | | | | 0.1 | 0.3 |
| 3 | do | 5 | 3.6 | 60.2 | 0.2 | 0.5 | 0.7 | 1.1 | | | 1.7 | 4.3 |
| 4 | do | 10 | 1.1 | 60.1 | 0.2 | 1.5 | 3.2 | 7.0 | | 9.4 | | |
| 5 | do | 10 | 3.9 | 34.7 | 12.8 | | | | | 13.4 | | |
| 6 | do | 10 | 2.1 | 65.3 | 0.0 | 0.05 | 0.2 | 1.2 | 2.0 | 2.7 | 3.3 | 8.2 |
| 7 | do | 10 | 2.4 | 59.2 | 0.05 | 0.1 | 0.2 | 0.3 | 0.4 | 0.6 | 0.8 | 5.4 |
| 8 | Oxidized polyethylene wax | 10 | 9–12 | 0 | 13.8 | | | | | | | |
| 9 | Chlorinated polyethylene wax | 10 | 0 | 62.7 | 13.1 | | | | | | | |
| 10 | Oxidized-chlorinated Fischer-Tropsch wax | 10 | 1.3 | 57.9 | 1.5 | 4.6 | 7.7 | 9.3 | 10.5 | | | |
| 11 | Commercial silicone solution B (3%) | (3) | | | 0.05 | 0.1 | 0.2 | 0.9 | | | 3.4 | 10.8 |
| 12 | Commercial silicone solution A (4%) | (4) | | | 0.3 | 1.1 | 1.7 | 3.9 | | | 6.3 | 10.1 |
| 13 | Paraffin wax | 10 | | | 0.7 | 1.9 | 3.1 | 5.4 | | | 7.7 | |
| 14 | Oxidized-chlorinated polyethylene wax | 10 | 3.6 | 60.9 | 0.05 | 0.1 | 0.1 | | | | 0.1 | 0.3 |
| 15 | Blank—No coating | | | | 12–14 | | | | | | | |

EXAMPLE 17

In order to illustrate the effect of repeated wetting and drying cycles on masonry treated with the oxidized-chlorinated wax materials, bricks were coated with the compositions of Examples 1 and 3 and allowed to absorb water through their coated faces for periods of 24 hours or more in a first wetting cycle. The uncoated portions of the wet bricks were then tightly wrapped with metal foil, weighed, placed coated face up, and allowed to "dry" in the atmosphere (ca. 25° C.) for 10 days, loss of weight being noted at intervals. The air dried bricks were next subjected to a second wetting cycle of 8 hours followed by a second drying cycle of 16 hours at 90° C.; then by a third wetting cycle of 23 hours, a third drying cycle of 24 hours at 90° C. and a fourth wetting cycle. During each wetting cycle, the bricks were weighed at intervals to determine water absorption.

Results of the tests are shown in Table III below, from which it will be observed that repeated wetting and drying of the coated surfaces in no case diminished their water repellencies, and in most cases enhanced it.

TABLE III

*Effect of alternate wetting and drying cycles on water-repellency of oxidized-chlorinated polyethylene coated bricks*

| Coating material | Wet cycle No. 1, weight gain—gm./kg. brick after— | | | Dry cycle No. 1, weight loss g./100 gs. of absorbed H₂O after 10 days | Wet cycle No. 2, weight gain g./kg. brick after 8 hrs. | Dry cycle No. 2, 16 hrs. | Wet cycle No. 3, weight gain g./kg. brick after— | | Dry cycle No. 3, 24 hrs. | Wet cycle No. 4, weight gain g./kg. brick after 7 hrs. |
|---|---|---|---|---|---|---|---|---|---|---|
| | 24 hrs. | 80 hrs. | 100 hrs. | | | | 24 hrs. | 216 hrs. | | |
| 3% oxidized 65% chlorinated polyethylene wax 5% solution | 77 | | | 75 | 17 | (¹) | 48 | | (¹) | 5 |
| 3.6% oxidized 60% chlorinated polyethylene wax 5% solution | 46 | | | 81 | 3 | (¹) | 24 | | (¹) | 3 |
| 3% oxidized 65% chlorinated polyethylene wax 10% solution | 3 | 4 | 83 | 68 | 8 | (¹) | 3 | 12 | (¹) | |
| Commercial silicone solution | 127 | | | 66 | 0 | (¹) | 17 | | (¹) | 4 |

¹ Dried at 90° C. to original dry brick weight.

EXAMPLE 18

Cement blocks were dried and coated in the manner described under Examples 1–14 above and tested for water repellency as above described. After 120 hours, blocks coated with a 10% solution of 3% oxidized–67% chlorinated polyethylene wax had absorbed 1.6% their weight of water. A block coated with a commercial 4% silicone solution tested for comparison, had absorbed 0.8% its weight of water after 120 hours.

EXAMPLE 19

A series of bricks coated as described in Examples 1–14, with oxidized, chlorinated polyethylene wax containing 3% oxygen and 65% chlorine were exposed on a roof to the weather. No discoloration or efflorescence of the bricks was apparent after exposure for 600 days.

EXAMPLE 20

A series of bricks were coated with 12 grams (100 ft.²/gal.) of a 5% and a 10% solution in xylene of a 3% oxidized 65% chlorinated polyethylene wax, and placed uncoated face down in a concentrated solution of sodium sulfate, ½" liquid depth. After about 72 hours the bricks were removed from the solution, allowed to air dry and examined for efflorescence. No efflorescence whatever was discernible on the bricks coated with the oxidized-chlorinated polyethylene wax. One of the bricks was fractured and showed an appreciable deposit of salt within the brick, reaching only to the point to which the repellent penetrated.

While the above describes the preferred embodiments of the invention, it will be understood that departures may be made therefrom within the scope of the specification and claims.

We claim:

1. A water-repellent composition adapted for application to porous masonry surfaces comprising a solution in a volatile solvent of at least about 5% of an oxidized-chlorinated polyethylene wax having an average molecular weight between about 1,000 and about 6,000 and being oxidized to the extent of at least about 1% by weight of oxygen and chlorinated to between about 55% and about 70% by weight of chlorine, based on the weight of the oxidized-chlorinated polyethylene wax.

2. The composition of claim 1 in which the solvent is selected from the group consisting of liquid aromatic hydrocarbons, cycloaliphatic unsaturated hydrocarbons and ketones and has a boiling point within the range between about 75° C. and about 175° C.

3. The composition of claim 2 wherein the oxidized-chlorinated polyethylene wax contains between about 1% and about 5% oxygen, and between about 55% and about 65% chlorine.

4. The process for rendering porous surfaces water repellent which comprises applying thereto at the coverage rate of not more than about 130 square feet of surface per gallon, a water repellent solution comprising at least about 5% by weight of an oxidized-chlorinated polyethylene wax having an average molecular weight between about 1,000 and about 6,000 containing at least about 1% of oxygen and between about 55% and about 70% of chlorine by weight based on the weight of the oxidized-chlorinated wax, dissolved in a liquid aromatic solvent.

5. The process according to claim 4 wherein the oxidized-chlorinated polyethylene wax contains between about 1% and 5% oxygen, between about 55% and about 65% chlorine by weight, and wherein the aromatic solvent has a boiling point in the range between about 75° C. and about 175° C.

6. A masonry surface having thereon a coating comprising at least about 0.3 pound per 100 square feet of surface, of an oxidized-chlorinated polyethylene wax having an average molecular weight between about 1,000 and about 6,000, containing at least about 1% oxygen, and between about 55% and about 70% chlorine.

7. A water-repellent composition adapted for application to porous masonry surfaces, comprising a solution in a solvent selected from the group consisting of liquid aromatic hydrocarbons, cycloaliphatic unsaturated hydrocarbons and ketones of at least about 5% of an oxidized-chlorinated polyethylene wax having an average molecular weight between about 1,000 and about 6,000, containing at least about 1% of oxygen and between about 55% and about 70% of chlorine based on the weight of the oxidized-chlorinated polyethylene wax.

8. The composition according to claim 7, wherein the oxidized-chlorinated polyethylene wax contains between about 1% and about 5% oxygen, and between about 55% and about 65% of chlorine, and wherein the solvent is a liquid aromatic hydrocarbon and has a boiling point within the range between about 75° C. and about 175° C.

9. The composition according to claim 7, wherein the wax is an oxidized-chlorinated polyethylene/isopropanol telomer wax.

10. The process for rendering porous surfaces water-repellent which comprises applying thereto at the coverage rate of not more than about 130 square feet of surface per gallon, a water-repellent solution comprising at least about 5% by weight of an oxidized-chlorinated polyethylene wax having an average molecular weight between about 1,000 and about 6,000, containing at least about 1% of oxygen and between about 55% and about 70% of chlorine by weight, based on the weight of the oxidized-chlorinated polyethylene wax, dissolved in a liquid aromatic solvent.

11. The process according to claim 10, wherein the oxidized-chlorinated polyethylene wax contains between about 1% and about 5% oxygen, between about 55% and about 65% chlorine by weight, and wherein the aromatic solvent has a boiling point in the range between about 75° C. and about 175° C.

12. The process for preventing unsightly efflorescence on brick surfaces which comprises, applying to said surfaces at a coverage rate of not more than about 130 square feet of surface per gallon, a solution, in a liquid aromatic solvent, comprising at least about 5% by weight of an oxidized-chlorinated polyethylene wax, having an average molecular weight between about 1,000 and about 6,000, said wax containing at least about 1% of oxygen and between about 55% and about 70% of chlorine by weight based on the weight of the oxidized chlorinated polyethylene wax.

13. Brick surfaces, free from a tendency to effloresce, having deposited thereon a coating comprising at least about 0.3 pound per 100 square feet of surface, of an oxidized-chlorinated polyethylene wax, having an average molecular weight between about 1,000 and about 6,000 containing at least about 1% oxygen and between about 55% and about 70% chlorine.

References Cited in the file of this patent

UNITED STATES PATENTS

| | | |
|---|---|---|
| 1,958,397 | Scripture | May 8, 1934 |
| 2,617,746 | Parry | Nov. 11, 1952 |
| 2,766,214 | Erchak et al. | Oct. 9, 1956 |

UNITED STATES PATENT OFFICE
CERTIFICATE OF CORRECTION

Patent No. 3,007,812

November 7, 1961

Burton F. B. Smith et al.

It is hereby certified that error appears in the above numbered patent requiring correction and that the said Letters Patent should read as corrected below.

Columns 5 and 6, Table I, under the heading "Percent weigh gain (hrs.)", column 1, line 1, for "0.04" read -- 0.4 --; column 6, Table II, under the heading "Coating material", line 5, for "polyetyhlene" read -- polyethylene --.

Signed and sealed this 17th day of April 1962.

(SEAL)
Attest:

ESTON G. JOHNSON
Attesting Officer

DAVID L. LADD
Commissioner of Patents